(12) United States Patent
Toles et al.

(10) Patent No.: US 10,914,036 B2
(45) Date of Patent: Feb. 9, 2021

(54) INK FIXATIVE SOLUTIONS

(71) Applicant: Hewlett-Packard Development Company, L.P., Fort Collins, CO (US)

(72) Inventors: Christopher Toles, San Diego, CA (US); Xulong Fu, San Diego, CA (US); Kimberly Zargarian, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 228 days.

(21) Appl. No.: 15/743,340

(22) PCT Filed: Oct. 27, 2015

(86) PCT No.: PCT/US2015/057661
§ 371 (c)(1),
(2) Date: Jan. 10, 2018

(87) PCT Pub. No.: WO2017/074327
PCT Pub. Date: May 4, 2017

(65) Prior Publication Data
US 2018/0202105 A1    Jul. 19, 2018

(51) Int. Cl.
*D21H 19/12*    (2006.01)
*B41M 5/00*    (2006.01)
(Continued)

(52) U.S. Cl.
CPC .............. *D21H 19/12* (2013.01); *B32B 37/12* (2013.01); *B41M 5/0017* (2013.01); *B41M 5/52* (2013.01);
(Continued)

(58) Field of Classification Search
CPC ....................................................... D21F 5/04
See application file for complete search history.

(56) References Cited

U.S. PATENT DOCUMENTS 3,873,354 A    3/1975    Walters
5,916,418 A *  6/1999    Frank .................. D21H 19/12
                                                162/134
(Continued)

FOREIGN PATENT DOCUMENTS

EP    2505621    10/2012
WO   2011099977   8/2011
(Continued)

OTHER PUBLICATIONS

Extended European Search Report dated Jun. 19, 2018 for PCT/US2015/057661, Applicant Hewlett-Packard Development Company, L.P.
(Continued)

*Primary Examiner* — Barbara J Musser
(74) *Attorney, Agent, or Firm* — Thorpe North & Western LLP

(57) ABSTRACT

The present disclosure is drawn to ink fixative solutions, which can consist essentially of a polyvalent metal salt, a holdout additive, and water. The polyvalent metal salt can be present in an amount from about 1 wt % to about 5 wt %, with respect to the entire weight of the ink fixative solution. The holdout additive can be present in an amount from about 2 wt % to about 20 wt %, with respect to the entire weight of the ink fixative solution. The holdout additive can be polyethylene glycol, glycerol, carboxy methyl cellulose, hydroxy ethyl cellulose, a fatty acid, a fatty acid ethoxylate, or combinations thereof.

12 Claims, 3 Drawing Sheets

(51) Int. Cl.
*D21H 19/10* (2006.01)
*C09D 11/54* (2014.01)
*B41M 5/52* (2006.01)
*D21H 19/72* (2006.01)
*D21H 17/66* (2006.01)
*D21F 5/00* (2006.01)
*B32B 37/12* (2006.01)
*D21H 23/28* (2006.01)
*D21H 23/26* (2006.01)

(52) U.S. Cl.
CPC ............... *C09D 11/54* (2013.01); *D21F 5/00* (2013.01); *D21H 17/66* (2013.01); *D21H 19/10* (2013.01); *D21H 19/72* (2013.01); *D21H 23/26* (2013.01); *D21H 23/28* (2013.01); *B41M 5/5218* (2013.01); *B41M 5/5227* (2013.01); *B41M 5/5236* (2013.01)

(56) References Cited

U.S. PATENT DOCUMENTS

| | | | |
|---|---|---|---|
| 6,533,406 B2 | 3/2003 | Katsuragi et al. | |
| 6,573,011 B1 | 6/2003 | Nair et al. | |
| 6,706,104 B2 | 3/2004 | Takuhara et al. | |
| 7,261,789 B2 * | 8/2007 | Mattila | B31F 1/20 156/209 |
| 7,517,073 B2 | 4/2009 | Nito et al. | |
| 8,092,874 B2 | 1/2012 | Wexler et al. | |
| 8,092,875 B2 | 1/2012 | Wexler et al. | |
| 8,227,054 B2 | 7/2012 | Ono et al. | |
| 8,609,210 B2 | 12/2013 | Nagoshi et al. | |
| 8,906,476 B2 | 12/2014 | Tan et al. | |
| 2003/0079652 A1 | 5/2003 | Choy | |
| 2003/0234846 A1 | 12/2003 | Koga et al. | |
| 2004/0096598 A1 | 5/2004 | Kasamatsu et al. | |
| 2005/0170148 A1 * | 8/2005 | Mattila | B32B 27/28 428/174 |
| 2006/0025307 A1 * | 2/2006 | Tamagawa | G03G 7/0046 503/227 |
| 2007/0134451 A1 * | 6/2007 | Hakamada | C09D 11/30 428/32.38 |
| 2008/0038491 A1 | 2/2008 | Ikeda et al. | |
| 2008/0163993 A1 | 7/2008 | Varnell | |
| 2008/0264587 A1 * | 10/2008 | Champ | D21H 23/28 162/9 |
| 2009/0117376 A1 * | 5/2009 | Bloembergen | B31F 1/2818 428/341 |
| 2012/0019588 A1 * | 1/2012 | Mubarekyan | C09D 11/30 347/20 |
| 2012/0128902 A1 | 5/2012 | Panettieri | |

FOREIGN PATENT DOCUMENTS

| | | |
|---|---|---|
| WO | 2011112190 | 9/2011 |
| WO | 2012057790 | 5/2012 |

OTHER PUBLICATIONS

International Search Report dated Jul. 7, 2016 for PCT/US2015/057661, Applicant Hewlett-Packard Development Company, L.P.

* cited by examiner

INK FIXATIVE SOLUTIONS

BACKGROUND

Corrugated linerboard or containerboard packaging is often used as a packaging material. This cellulose fiber-based material includes a fluted medium bonded to one or two flat liner paper faces. The fluted medium and the liner paper are usually made of kraft pulp. In a typical manufacturing process for corrugated paperboard packaging materials, the fluted medium is first formed by heating and moistening a sheet of corrugating medium and then forming the flute pattern in the sheet using geared wheels. The fluted medium is then bonded using an adhesive to one sheet of liner paper for single-faced corrugated linerboard, or between two sheets of liner paper for double-faced corrugated linerboard or containerboard Kraft containerboard is often unbleached and brown in color. Sometimes one face of containerboard is bleached or coated to make a surface for printing. In other cases, the normal unbleached surface of the containerboard can be printed on. Printing on containerboard is often performed using offset or flexographic printing processes after the containerboard has been corrugated.

DETAILED DESCRIPTION

Figure 1:
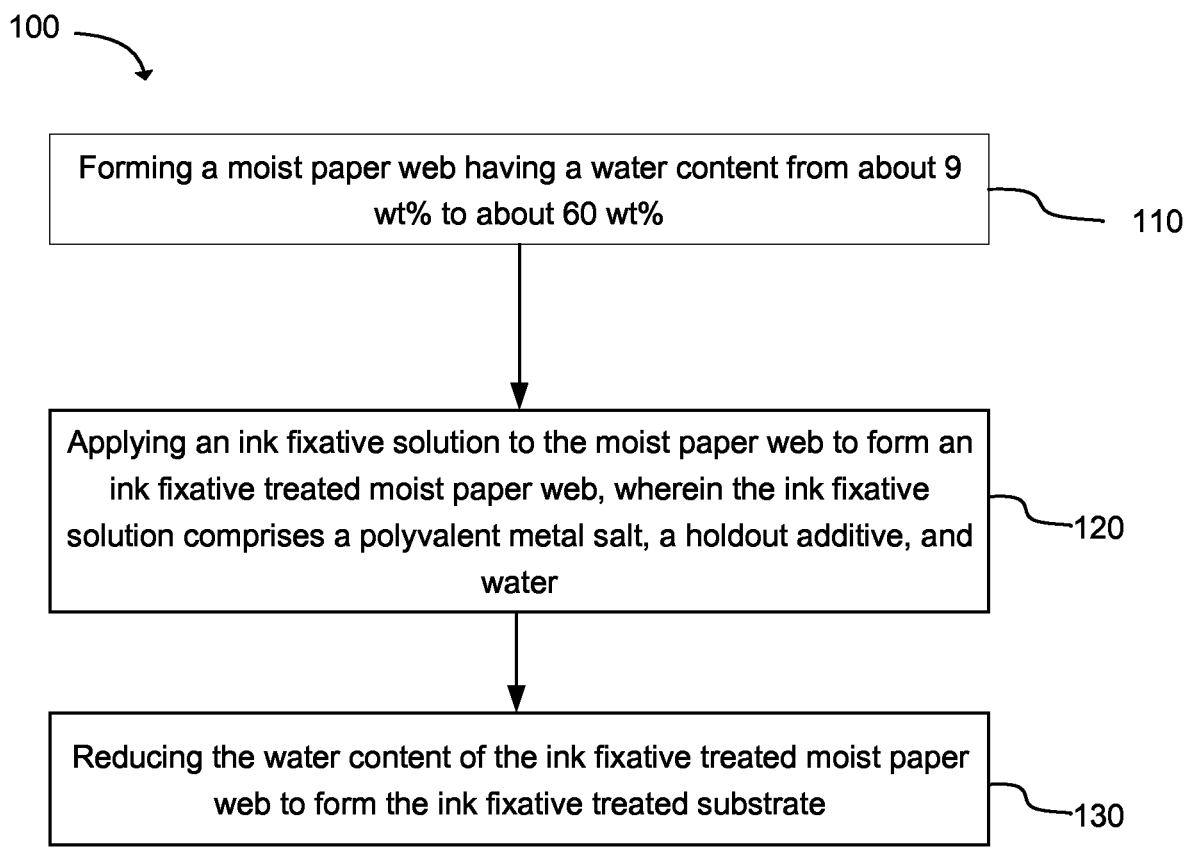
FIG. 1 is a flow chart of a method of making an ink fixative treated substrate in accordance with examples of the present technology.

The present disclosure is drawn to ink fixative solutions, methods of making ink fixative treated substrates, and liner paper treated with ink fixatives. The ink fixative solutions provided by the present technology can include or consist essentially of a polyvalent metal salt in an amount from about 1 wt % to about 5 wt %, with respect to the entire weight of the ink fixative solution. The ink fixative solutions can also have a holdout additive to increase holdout of the salt when the solution is applied to liner paper. The holdout additive can be a humectant or water retention aid, such as polyethylene glycol, glycerol, carboxy methyl cellulose, hydroxyl ethyl cellulose, a fatty acid, a fatty acid ethoxylate, or a combination thereof. The holdout additive can be present in an amount from about 2 wt % to about 20 wt %, with respect to the entire weight of the ink fixative solution. As used herein, the term "ink fixative" refers to a composition capable of receiving ink and holding colorants in the ink to a greater degree than porous substrate not treated with ink fixative. In particular, the ink fixatives described herein are capable of holding colorants at or near the surface of a substrate so that optical density and color gamut of the printed image can be improved compared to a porous substrate that is not treated with the ink fixative. Likewise, "ink fixative solution" refers to a solution used to deliver the ink fixative to the media substrate.

By their nature, corrugated packaging processes present difficulties with respect to treating the corrugated packaging materials with ink fixative and printing ink on the materials. The equipment presently used for manufacturing liner paper often does not include a size press. In other types of paper manufacturing, a size press is often used to apply coatings to the paper. Because of the layout of machinery involved, it can be difficult or impossible to add a size press into existing manufacturing processes that do not already include a size press. Thus, the ink fixative solutions according to the present technology cannot be applied using a size press in certain existing liner paper manufacturing processes that do not already have a size press. However, in some examples of the present technology, the ink fixative solution can be sprayed onto the liner paper surface at a convenient location in the existing liner paper manufacturing process.

Locations suitable for spraying the ink fixative solution are often at a point in the process where the liner paper still has a high degree of moisture. Spraying a solution consisting of water and salt onto the wet liner paper can result in the salt penetrating too far into the body of the liner paper. This is due to a "wet sponge" effect, which is a property of wet paper that makes the paper absorb the salt more efficiently that dry paper would. When the salt penetrates deep into the body of the liner paper, less salt is available at the surface to act as an ink fixative when ink is printed on the liner paper. The ink fixative solutions according to the present technology can further include a holdout additive, such as polyethylene glycol, glycerol, carboxy methyl cellulose, hydroxyl ethyl cellulose, a fatty acid, a fatty acid ethoxylate, or a combination thereof, which increases the holdout of the salt on the surface of the wet liner paper. By increasing the amount of salt that remains at the surface of the liner paper, the optical density and color gamut of images printed on the liner paper can be improved. In certain specific examples of the present technology, the ink fixative solutions can consist essentially of the salt, the holdout additive, and water.

In some cases, printing can be performed on sheets of liner paper before the liner paper is combined with a fluted medium to make corrugated linerboard. This is known as "pre-printing." Pre-printing can allow a single facing liner to be printed using a roll-fed press such as the HP high speed Web Press® as opposed to the flexographic or offset printing techniques commonly used on corrugated material. After the facing liner is pre-printed, the facing liner paper can be fed into a corrugator where it is heated and pressed against a fluted medium to which adhesive has been applied. The pressures applied in such corrugators can be from 300 to 500 pounds per linear inch (pli). If a second liner paper facing is to be applied on the opposite side, the single-face material is fed into another section where adhesive is applied to the exposed side of the fluted medium and the second facing is then adhered to the fluted medium.

The corrugation process can be difficult on printed media due to temperature and frictional forces. The ink fixative solutions according to the present technology can provide for high quality printing on liner paper with high optical density and color gamut, while also retaining sufficient durability of the printed image to undergo the corrugation process.

Referring now specifically to the polyvalent metal salt, this component can act as a flocculating agent when the salt contacts pigment in ink being printed over the ink fixative. When ink containing a pigment colorant is applied to the surface of a liner paper treated with the ink fixative solution, the pigment flocculates and "crashes out" of the ink. This causes the pigment to stay on the outermost surface of the liner paper while solvent in the ink can be absorbed into the liner paper. Retaining the pigment at the surface can increase the optical density and color gamut of the printed image. In some cases the polyvalent metal salt can be a cationic salt, which contains metal cations that interact with anionic pigment particles.

Generally, the polyvalent metal salt can be any water-soluble polyvalent metal salt. In specific examples, the polyvalent metal salt can include calcium chloride ($CaCl_2$), magnesium chloride ($MgCl_2$), magnesium sulfate ($MgSO_4$), aluminum chloride ($AlCl_3$), calcium nitrate ($Ca(NO_3)_2$), magnesium nitrate ($Mg(NO_3)_2$), magnesium acetate ($Mg(CH_3COO)_2$), zinc acetate ($Zn(CH_3COO)_2$) calcium propionate ($Ca(C_2H_5COO)_2$), or a combination thereof. In a particular example, the polyvalent metal salt can be calcium chloride. In further examples, the polyvalent metal salt can include a metal cation selected from calcium, copper, nickel, magnesium, zinc, barium, iron, aluminum, chromium, or another polyvalent metal. The polyvalent metal salt can also include an anion. In some examples, the anion can be fluoride, chloride, iodide, bromide, nitrate, chlorate, sulfate, acetate, or $RCOO^-$ where R is hydrogen or any low molecular weight hydrocarbon chain, e.g., C1 to C12. In a more specific example, the anion can be a carboxylate derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms may include formic acid, acetic acid, propionic acid, butyric acid, isobutyric acid, valeric acid, isovaleric acid, pivalic acid, and/or hexanoic acid. The cationic salt can also be a mixture of two or more different cationic salts.

In some cases, the polyvalent metal salt can be present in an amount from about 1 wt % to about 5 wt % with respect to the entire weight of the ink fixative solution. In more specific examples, the polyvalent metal salt can be present in an amount from about 1 wt % to about 3 wt % with respect to the entire weight of the ink fixative solution. In examples where the polyvalent metal salt is a mixture of two or more salts, the total amount of the mixture of salts can be within these ranges. In other words, whatever range is considered, it is understood that the range relates to total concentrations of salts, whether there be one, two, three, etc., specific salt species present.

The ink fixative or ink fixative solution can also have a holdout additive. The holdout additive can include a humectant such as polyethylene glycol or glycerol. In other examples, the holdout additive can include a water retention aid such as carboxy methyl cellulose, hydroxyl ethyl cellulose, fatty acids, or fatty acid ethoxylates. In certain examples, the holdout additive can be polyethylene glycol, glycerol, carboxy methyl cellulose, hydroxyl ethyl cellulose, a fatty acid, a fatty acid ethoxylate, or combinations thereof. In another example, the holdout additive can include polyethylene glycol. In a specific example, the holdout additive can be polyethylene glycol with a weight average molecular weight from about 200 g/mol to about 4000 g/mol. In another specific example, the holdout additive can be polyethylene glycol with a weight average molecular weight from about 200 g/mol to about 600 g/mol.

The holdout additive can be present in an amount from about 2 wt % to about 10 wt %, with respect to the entire weight of the ink fixative solution. In further examples, the holdout additive can be present in an amount from about 3 wt % to about 7 wt %, with respect to the entire weight of the ink fixative solution. In some cases, the ink fixative solution can contain a greater amount of holdout additive than polyvalent metal salt. In certain examples, the ink fixative solution can have a weight ratio of holdout additive to polyvalent metal salt from about 2:1 to about 11:1.

The ink fixative solution can be an aqueous solution. In some examples, the ink fixative solution can include from about 82 wt % to about 97 wt % water, with respect to the entire weight of the ink fixative solution. However, after application, the water is dried from the solution leaving ink fixative behind on the media. Furthermore, in some examples the ink fixative solution can be substantially devoid of additional sizing agents, pigments, or other ingredients commonly added in sizing solutions for paper manufacturing. In some examples, the ink fixative solution can consist essentially of or consist of the polyvalent metal salt, the holdout additive, and water. As used herein, being "substantially devoid" or other ingredients and "consisting essentially of" the polyvalent metal salt, holdout additive, and water means that the ink fixative solution contains no other ingredients, or contains other ingredients in such small amounts that the other ingredients have little to no affect on the functional properties of the ink fixative solution.

The present technology also extends to methods of making ink fixative treated substrates. FIG. 1 shows a flowchart of one example of a method 100 of making an ink fixative treated substrate. The method includes forming 110 a moist paper web having a water content from about 9 wt % to about 60 wt %. An ink fixative solution is applied 120 to the moist paper web to form an ink fixative treated moist paper web. The ink fixative solution includes a polyvalent metal salt, a holdout additive, and water. The method further includes reducing 130 the water content of the ink fixative treated moist paper web to form the ink fixative treated substrate. In certain specific examples, the ink fixative solution can consist of or consist essentially of the polyvalent metal salt, the holdout additive, and the water.

This method can be used during the process of manufacturing paper. In certain examples, the paper being manufactured can be a liner paper for corrugated packaging materials as described above. The methods according to the present technology can in some cases be applied to existing manufacturing processes for liner paper. In some examples, this can be accomplished by adding equipment for applying the ink fixative solution into the existing processes.

Figure 2:
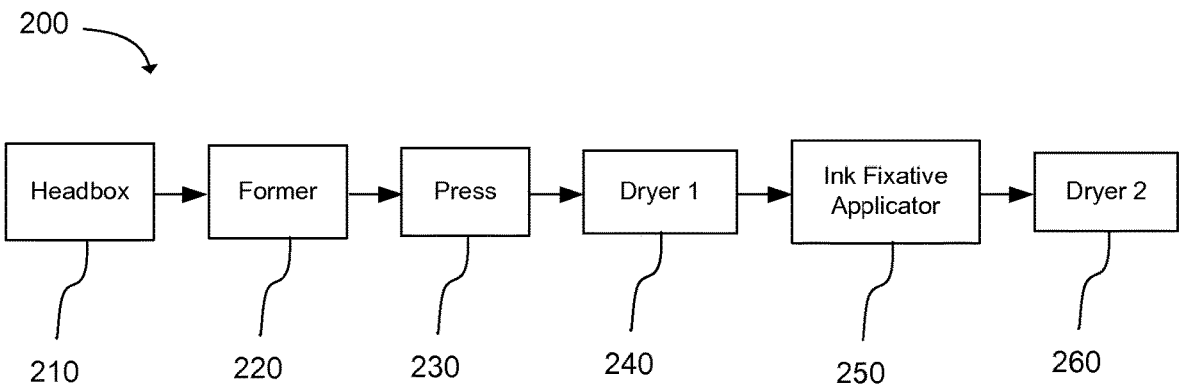
FIG. 2 shows a schematic of a liner paper manufacturing process in accordance with examples of the present technology.

FIG. 2 shows a schematic of an example of a process 200 for the manufacture of liner paper incorporating the methods of the present technology. The process utilizes a head box 210 containing a pulp slurry. The head box maintains a sufficient pressure to feed the pulp slurry to the former 220. In some cases, the former can include a continuous moving loop of fabric or mesh, known as a "wire," which supports the fibers from the pulp slurry and allows a portion of the water to drain. At this point in the process, the layer of fibers on the former is known as a "web." The water content of the web leaving the former can be, for example, about 75-80 wt %. The web is then fed through a press 230. The press removes more water from the web and consolidates the web. The web leaving the press section can have a water content of about 50-60 wt %, for example. After the press, the web is fed through a first dryer section 240. In some examples, the dryer can include heated rollers that cause water to evaporate from the web. The dryer is sometimes split into multiple sections with rollers that run at different speeds to account for shrinkage of the web as the paper dries. In the example process shown in FIG. 2, the dryer is split into two sections. An ink fixative applicator 250 is placed between the first dryer section and a second dryer section 260. The ink fixative applicator applies an ink fixative solution as described above. Because the ink fixative solution contains water, applying the solution to the web temporarily increases the water content of the web. The second dryer section then dries the web to its final water content. In some examples, the final water content can be about 5-10 wt %.

Although FIG. 2 shows the ink fixative applicator positioned between two dryer sections, in other examples the ink fixative applicator can be positioned at other points in the process. In some cases, the ink fixative solution can be applied at any point after a cohesive web has formed. In some examples, the ink fixative solution can be applied at any point after the former section. In other examples, the ink fixative solution can be applied at any point after the press section. In still further examples, the process can include at least one dryer after the ink fixative applicator so that the water content of the web can be reduced after applying the ink fixative solution. In alternative examples, the ink fixative applicator can be positioned after all dryers used in the process.

In a particular example of the present technology, a method of making an ink fixative treated substrate can include partially drying the moist paper web using a first dryer before applying the ink fixative solution. Then, the water content of the ink fixative treated moist paper web can be reduced by further drying the ink fixative treated moist paper web with a second dryer.

In other examples, the ink fixative solution can be applied at a point in the process where the water content of the web is from about 9 wt % to about 60 wt %. In a particular example, the ink fixative solution can be applied at a point in the process where the water content of the web is from about 15 wt % to about 50 wt %. As explained above, the holdout additive in the ink fixative solution can increase the holdout of the polyvalent metal salt so that less of the polyvalent metal salt soaks into the wet web. In an additional specific example, the ink fixative solution can be applied at a point in the process where the water content of the web is from about 20 wt % to about 40 wt %.

Figure 3:
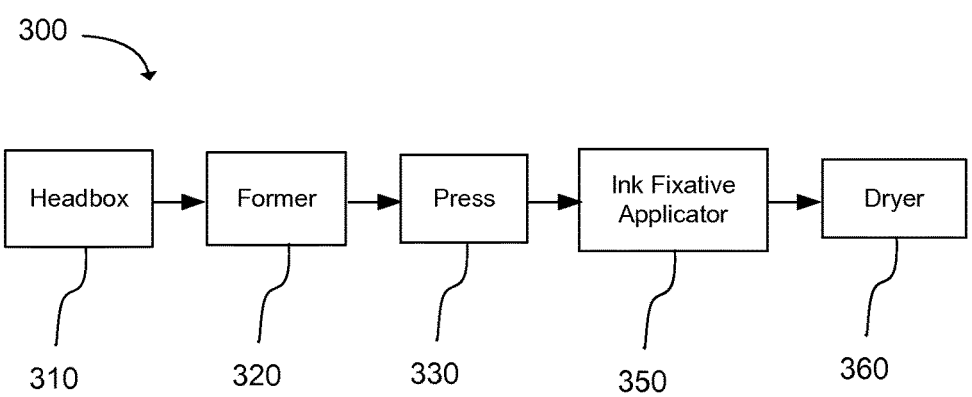
FIG. 3 shows a schematic of another liner paper manufacturing process in accordance with examples of the present technology.

FIG. 3 shows another example of a process 300 for manufacturing liner paper. In this process, a pulp slurry is fed from a headbox 310 to a former 320 to form a web. The web is then fed through a press section 330 to reduce the water content and consolidate the web. An ink fixative solution is then applied to the web using an ink fixative applicator 350. After the ink fixative applicator, the web is dried in a dryer 360 to reduce the water content down to the final water content.

Manufacturing processes for liner paper can include other additional equipment and stages not shown in FIGS. 2-3. For example, in many processes for manufacturing liner paper, two layers of fibers are laid on the former to make liner paper formed from two different types of fibers. In some cases, a primary head box can be used to deposit a first layer of fibers and a secondary head box can be used to deposit a second layer of fibers on the first layer. In one example, the bottom layer of fibers makes up about 70% of the total weight of the sheet and includes longer, less refined fibers to give the liner paper strength. The top layer of fiber can make up about 30% of the total weight of the sheet, and can include shorter, smoother, and more refined fibers to give the liner paper a smoother surface for printing. In such examples, the ink fixative solutions according to the present technology can be applied to the top layer of more refined fibers. In some cases, the top layer of fiber can include bleached pulp and optionally mineral filler added to the layer for opacity. This can provide a white surface for printing on the liner paper.

In some examples, the ink fixative applicator can include a sprayer. The sprayer can spray an ink fixative solution onto the web. Accordingly, in some examples the ink fixative solution can be formulated to be sprayable. For the example, the ink fixative solution can have a suitable viscosity and suitable surface tension for spraying. In various examples, the sprayer can be placed between two dryer sections, between the press section and a dryer section, between the forming section and the press section, or at another location in the manufacturing process where a cohesive web is present.

In a particular example of the present technology, the ink fixative solution can be sprayed onto the moist paper web after the moist paper web has been partially dried by a first dryer. Then, the water content of the ink fixative treated moist paper web can be reduced by further drying the ink fixative treated moist paper web with a second dryer.

In some examples, the manufacturing process can be a liner paper manufacturing process without a size press. In such processes, locations for adding an ink fixative applicator into the process can be limited. Therefore, a sprayer can be used as the ink fixative applicator in the locations described above. However, in other examples, the manufacturing process can be configured differently from those described above. Therefore, in some cases the ink fixative applicator can be another type of applicator. In various other examples, the ink fixative applicator can coat the web with the ink fixative solution by dip coating, cascade coating, roll coating, gravure coating, curtain coating, air knife coating, cast coating, Meyer rod coating, blade coating, film coating, metered size press coating, puddle size press coating, calender stack, and/or by using other known coating techniques.

The ink fixative solution used in the methods according to the present technology can include a polyvalent metal salt, a holdout additive, and water. In some examples, the polyvalent salt can be present in an amount from about 1 wt % to about 5 wt %, with respect to the entire weight of the ink fixative solution. The holdout additive can be present in an amount from about 2 wt % to about 10 wt %, with respect to the entire weight of the ink fixative solution.

In further examples, a weight ratio of the holdout additive to the polyvalent metal salt can be from about 2:1 to about 11:1. The weight ratio can be sufficient so that the holdout additive increases the holdout of the polyvalent metal salt when the ink fixative solution is applied to a moist web. This can result in better optical density and color gamut when ink is printed on the ink fixative treated substrate.

In various examples, the holdout additive can include a humectant, cellulose, a cellulose derivative, a fatty acid, a fatty acid derivative, or combinations thereof. Non-limiting specific examples of the holdout additive include polyethylene glycol, glycerol, carboxy methyl cellulose, hydroxyl ethyl cellulose, a fatty acid, a fatty acid ethoxylate, or combinations thereof.

As explained above, the methods of the present technology can be sufficient to improve optical density and color gamut of images printed on liner paper. These effects can be achieved without requiring any additional coatings on the liner paper. For example, the ink fixative solution according to the present technology can be applied to the liner paper without applying any additional sizing agents, pigments, or other additives commonly used to improve a printing surface of paper materials. Thus, in some examples the present technology can provide unbleached liner paper that can be printed with improved optical density and color gamut.

After a liner paper sheet has been manufactured using the methods of the present technology, the liner paper sheet can be further used to make packaging materials with images printed thereon. liner paper manufacture often takes place as a separate step from the corrugation step. In many cases, the liner paper is manufactured in a separate facility and then transported to a corrugation facility where the liner is corrugated with a fluted medium to make corrugated packaging material. The present technology provides an ink fixative treated liner paper that can be printed on before corrugation. Because the liner is not corrugated before printing, the printing can be done with printing techniques that cannot be used with corrugated board. In one example, printing can be performed by high speed digital press. In a specific example, printing can be performed by a high speed ink jet press, such as the HP high speed Web Press®. In other examples, printing can be performed by offset printing, dry electrophotographic printing, liquid electrophographic printing, flexographic printing, or gravure printing.

In some cases, the ink used for printing on the liner paper can be a water-based ink, such as a water-based inkjet ink, or a pigmented water-based inkjet ink. Inkjet inks generally include a colorant dispersed or dissolved in an ink vehicle. As used herein, "liquid vehicle" or "ink vehicle" refers to the liquid fluid in which a colorant is placed to form an ink. A wide variety of ink vehicles may be used with the methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc.

Generally the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. In most instances, dyes are water soluble. Furthermore, as used herein, "pigment" generally includes pigment colorants, magnetic particles, aluminas, silicas, and/or other ceramics, organo-metallics or other opaque particles. In one example, the colorant can be a pigment. In a further example, the colorant can be an anionic pigment that can interact with metal cations from the polyvalent metal salt in the ink fixative layer of the substrate.

Typical ink vehicle formulations can include water, and can further include co-solvent(s) present in total at from 0.1 wt % to 40 wt %, depending on the jetting architecture, though amounts outside of this range can also be used. Further, additional non-ionic, cationic, and/or anionic surfactants can be present, ranging from 0.01 wt % to 10 wt %. In addition to the colorant, the balance or much of the remaining of formulation components can be purified water and other known liquid additives. Other solids can likewise be present in the inkjet ink, such as latex particles.

Consistent with the ink formulations of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), ACTICIDE® (Thor Specialties Inc.) and combinations thereof.

Additionally, the present technology extends to ink fixative treated liner paper. In one example, an ink fixative treated liner paper can include a liner paper substrate and an ink fixative layer on a surface of the liner paper substrate. The ink fixative layer can include a polyvalent metal salt and a holdout additive. The holdout additive can be polyethylene glycol, glycerol, carboxy methyl cellulose, hydroxy ethyl cellulose, a fatty acid, a fatty acid ethoxylate, or combinations thereof. In a further example, the ink fixative layer can consist essentially of the polyvalent metal salt and the holdout additive.

Figure 4:
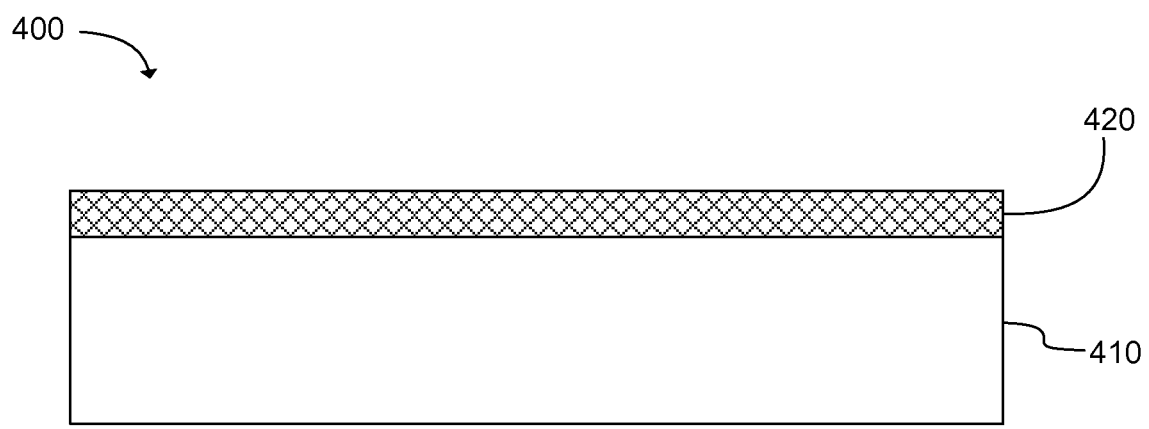
FIG. 4 is a cross sectional view of an ink fixative treated liner paper in accordance with examples of the present technology.

FIG. 4 shows an example of an ink fixative treated liner paper 400. The ink fixative treated liner paper includes a liner paper substrate 410 and an ink fixative layer 420 on a surface of the liner paper substrate.

In addition to providing improved optical density and color gamut when the liner paper is printed, the ink fixative layer can also be sufficiently durable to undergo the corrugation process after printing. The corrugation process can involve high pressures, temperatures, and frictional forces on the liner paper. However, images printed on the ink fixative layer according to the present technology can go through the corrugation process with little or no visible damage to the printed image.

It is noted that, as used in this specification and the appended claims, the singular forms "a," "an," and "the" include plural referents unless the content clearly dictates otherwise.

When referring to "high speed" as it is related to a digital printing press or other high speed printer, e.g., presses such as the HP T230 Web Press® or the HP T350 Web Press®, or presses such as page wide office printers (PWA) including the HP OfficeJet® Pro X duplex printer. In one example, the HP T350 Web Press® can print on media at a rate of 400 feet per minute. This capability would be considered high speed. In another example, and more generally, printing at 100 feet per minute would also be considered high speed.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

In this disclosure, "comprises," "comprising," "having," "includes," "including," and the like, and are generally interpreted to be open ended terms. The term "consisting of" is a closed term, and includes only the methods, compositions, components, steps, or the like specifically listed. "Consisting essentially of" or "consists essentially" or the like, when applied to methods, compositions, components, steps, or the like encompassed by the present disclosure, refers to elements like those disclosed herein, but which may contain additional composition components, method steps, etc., that do not materially affect the basic and novel characteristic(s) of the compositions, methods, etc., compared to those of the corresponding compositions, methods, etc., disclosed herein. When using an open ended term, like "comprising" or "including," it is understood that direct support should be afforded also to "consisting essentially of" language as well as "consisting of" language as if stated explicitly, and vice versa.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the ink fixative solution, the method of making an ink fixative treated substrate, and the ink fixative treated liner paper, each of these discussions can be considered applicable to each of these examples, whether or not they are explicitly discussed in the context of that example. Thus, for example, in discussing details about the ink fixative solution per se, such discussion also refers to the methods and the ink fixative treated liner paper described herein, and vice versa.

The following examples illustrate an ink fixative solution according to the present technology. However, it is to be understood that these examples are only exemplary or illustrative of the application of the principles of the present compositions, media, and methods. Numerous modifications and alternative compositions, media, and methods may be devised without departing from the spirit and scope of the present disclosure. The appended claims are intended to cover such modifications and arrangements. Thus, while the technology has been described with particularity, the following examples provide further detail in connection with the present technology.

EXAMPLES

Example 1—Print Quality

An ink fixative solution was prepared including 1.8 wt % $CaCl_2$ and 4.7 wt % polyethylene glycol (PEG), with the remainder being water. The weight ratio of PEG to $CaCl_2$ was approximately 2.6. A comparative solution was also prepared having 1.8 wt % $CaCl_2$ with the remainder being water. The two solutions were applied to pre-moistened sheets of 42# white top liner paper which had been soaking in deionized water and allowed to dry to about 39 wt % moisture. The solutions were applied using a #8 Meyer rod. The treated sheets were then dried using a blow dryer and allowed to sit for 24 hours. One hundred microliters of black pigmented ink was then drawn down using a #8 Meyer rod onto the liner paper sheets and allowed to dry under ambient conditions.

A black pigment-based ink was printed on each substrate and the black optical density of the ink on the liner paper sheets was measured using an X-Rite™ spectrodensitometer (X-Rite Corporation) with a setting of D65/2 and Status A. The working example with the ink fixative solution had a black optical density of about 1.54, while the comparative example had a black optical density of about 1.23. Thus, including both the $CaCl_2$ and the PEG in the ink fixative solution provides better optical density than $CaCl_2$ alone.

Example 2—Durability

Samples of liner paper were coated with the working example ink fixative solution and the comparative solution described in Example 1 above. The treated liner sheets were then printed using an HP CM8050 Color Multifunctional Printer equipped with A50 standard web press inks. The prints were made at a setting of 2 pass/6 dry spin. The samples were then subjected to lab-based tests in a corrugation tester. The corrugation tester consisted of a smooth metal plate heated to 300-350° F. (149-177° C.). The samples were dragged against the smooth metal plate under an applied load and the fluted medium sample to simulate the corrugation process. After the corrugation tests, the samples were inspected visually to evaluate for visible wear. Both samples provided excellent durability and showed no visible wear. Thus, the working examples ink fixative solution provided better optical density without sacrificing durability during corrugation.

While the disclosure has been described with reference to certain examples, various modifications, changes, omissions, and substitutions can be made without departing from the spirit of the disclosure. It is intended, therefore, that the disclosure be limited only by the scope of the following claims.

What is claimed is:

1. A method of making an ink fixative treated substrate, comprising: forming a moist paper web having a first water content from about 15 wt % to about 60 wt %; applying an ink fixative solution to the moist paper web to form an ink fixative treated moist paper web, wherein the ink fixative solution consists essentially of: a polyvalent metal salt, a holdout additive, wherein the holdout additive is a polyethylene glycol, glycerol, carboxy methyl cellulose, hydroxy ethyl cellulose, a fatty acid, a fatty acid ethoxylate, or combinations thereof, and water; and reducing the water content of the ink fixative treated moist paper web to a final water content that is less than the first water content to form the ink fixative treated substrate.

2. The method of claim 1, wherein the polyvalent metal salt is present in an amount from about 1 wt % to about 5 wt %, with respect to the entire weight of the ink fixative solution and the holdout additive is present in an amount from about 2 wt % to about 20 wt %, with respect to the entire weight of the ink fixative solution.

3. The method of claim 1, wherein a weight ratio of the holdout additive to the polyvalent metal salt is from about 2:1 to about 11:1.

4. The method of claim 1, wherein applying the ink fixative solution comprises spraying the ink fixative solution onto the moist paper web.

5. The method of claim 4, wherein the moist paper web has been partially dried using a first dryer before the ink fixative solution is sprayed onto the moist paper web, and wherein reducing the water content of the ink fixative treated moist paper web comprises further drying the ink fixative treated moist paper web with a second dryer.

6. The method of claim 1, wherein the ink fixative treated substrate is devoid of sizing agents other than the ink fixative solution.

7. The method of claim 1, wherein the ink fixative treated substrate is a liner paper.

8. The method of claim 7, further comprising printing a pigmented ink on the liner paper and bonding the liner paper together with a fluted medium after printing.

9. The method of claim 1, wherein the first water content is from about 20 wt % to about 40 wt %.

10. The method of claim 1, wherein applying the ink fixative solution comprises spraying the ink fixative solution onto the moist paper web, and wherein a weight ratio of the holdout additive to the polyvalent metal salt is from about 2:1 to about 11:1.

11. The method of claim 1, wherein the holdout additive is carboxy methyl cellulose, hydroxyl ethyl cellulose, a fatty acid, a fatty acid ethoxylate, or combinations thereof.

12. The method of claim 1, wherein the polyvalent metal salt is calcium chloride, magnesium chloride, magnesium sulfate, calcium nitrate, magnesium nitrate, magnesium acetate, zinc acetate, calcium propionate, or a combination thereof.

* * * * *